(12) United States Patent
Hanafusa

(10) Patent No.: US 9,836,711 B2
(45) Date of Patent: Dec. 5, 2017

(54) JOB EXECUTION SYSTEM, JOB EXECUTION PROGRAM, AND JOB EXECUTION METHOD

(75) Inventor: Ryo Hanafusa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 569 days.

(21) Appl. No.: 14/398,999

(22) PCT Filed: May 17, 2012

(86) PCT No.: PCT/JP2012/062644
§ 371 (c)(1),
(2), (4) Date: Nov. 5, 2014

(87) PCT Pub. No.: WO2013/171879
PCT Pub. Date: Nov. 21, 2013

(65) Prior Publication Data
US 2015/0127413 A1    May 7, 2015

(51) Int. Cl.
*G06Q 10/06* (2012.01)
*G06F 9/50* (2006.01)

(52) U.S. Cl.
CPC ..... *G06Q 10/06316* (2013.01); *G06F 9/5027* (2013.01)

(58) Field of Classification Search
CPC .................. G06Q 10/06316; G06F 9/5027
See application file for complete search history.

(56) References Cited

U.S. PATENT DOCUMENTS

| | | | |
|---|---|---|---|
| 7,073,174 B2 | 7/2006 | Volkoff et al. | |
| 7,600,253 B1 * | 10/2009 | Wang | G06F 17/30604 705/50 |
| 7,872,769 B2 * | 1/2011 | Akashi | G06F 3/1213 358/1.14 |
| 8,069,251 B2 * | 11/2011 | Thornburgh | H04L 67/1008 709/201 |
| 8,413,135 B2 * | 4/2013 | Aaron | G06F 21/51 717/174 |
| 8,549,147 B2 * | 10/2013 | Akiyama | G06F 9/5055 709/201 |
| 8,719,801 B2 * | 5/2014 | Gulwani | G06F 11/3404 717/126 |
| 8,954,971 B2 * | 2/2015 | Zhao | G06F 9/4843 718/102 |
| 8,982,384 B2 * | 3/2015 | Evanitsky | G06F 3/1204 358/1.15 |
| 9,032,207 B2 * | 5/2015 | Onno | H04N 5/262 380/205 |

(Continued)

FOREIGN PATENT DOCUMENTS

| | | |
|---|---|---|
| JP | 2003-122540 A | 4/2003 |
| JP | 2004-302741 A | 10/2004 |

(Continued)

*Primary Examiner* — Yonas Bayou
(74) *Attorney, Agent, or Firm* — Baker Botts L.L.P.

(57) ABSTRACT

In order to reduce the load of an approval process when approval is required to execute computation jobs using computer resources, the job execution system according to the present invention groups multiple computation jobs and then requests approval in units of groups, and when approval with respect to a group is obtained, all of the computation jobs included in that group are treated as having obtained approval.

19 Claims, 13 Drawing Sheets

(56) References Cited

U.S. PATENT DOCUMENTS

| | | | | |
|---|---|---|---|---|
| 9,311,612 B2* | 4/2016 | Delchev | .................. | G06Q 10/06 |
| 2002/0059122 A1* | 5/2002 | Inoue | ..................... | G06Q 10/06 |
| | | | | 705/29 |
| 2002/0184294 A1* | 12/2002 | Volkoff | ................... | G06F 9/465 |
| | | | | 718/103 |
| 2007/0226743 A1* | 9/2007 | Takahashi | ............. | G06F 9/5066 |
| | | | | 718/104 |

FOREIGN PATENT DOCUMENTS

| | | |
|---|---|---|
| JP | 2007-264794 A | 10/2007 |
| JP | 2009-59293 A | 3/2009 |
| JP | 2009-230257 A | 10/2009 |
| WO | 2007/105512 A1 | 9/2007 |

* cited by examiner

FIG. 2

| group ID (241) | representative job ID (242) | resource ID (243) | requester (244) | authorizer ID (245) | answer (246) | resource ID before division (247) | operator ID (248) | application job ID (249) |
|---|---|---|---|---|---|---|---|---|
| 00000001 | sales totalization | file 1 | IP address 1 port 1 | authorizer 1 | authorized | none | operator 1 | sales totalization |
| 00000002 | division A salary payment | file 2.1 | IP address 2 port 2 | authorizer 2 | dismissed | file 2 | operator 2 | salary payment |
| 00000002 | division B salary payment | file 2.2 | IP address 3 port 3 | authorizer 2 | none | file 2 | operator 2 | salary payment |

| group ID | resource ID | authorization result |
|---|---|---|
| 00000001 | file 1 | authorized |
| 00000002 | file 2 | authorized |
| 00000003 | file 3 | dismissed |

| resource ID | authorizer ID |
|---|---|
| file 1 | authorizer 1 |
| file 2 | authorizer 2 |
| file 3 | authorizer 3 |
| file 4 | authorizer 4 |
| file 5 | authorizer 4 |

| group ID | resource ID after division | resource ID before division |
|---|---|---|
| 00000002 | file 2.1 | file 2 |
| 00000002 | file 2.2 | file 2 |

FIG. 6 authorization request list — 310

| chk | group ID | representative job ID | resource ID before division | operator ID | application job | priority |
|---|---|---|---|---|---|---|
| ☑ | 00000002 | division A salary payment | file 2 | operator 2 | salary payment | high |
| ☑ | 00000002 | division B salary payment | file 2 | operator 2 | salary payment | middle |

311

[update] 312
[permit] 313
[dismiss] 314

JOB EXECUTION SYSTEM, JOB EXECUTION PROGRAM, AND JOB EXECUTION METHOD

TECHNICAL FIELD

The present invention relates to a technique for executing operational jobs using computer resources.

BACKGROUND ART

Along with increase in data amount, distributed processing such as grid computing is drawing attentions. An application example of distributed processing is a calculation of total sales. It is assumed here that the total sales amount is calculated by adding all transaction amounts that are registered as transaction data. If the transactional amount is small, a single computer may complete the calculation within a short time. If the transactional amount is large, it may take a long time to calculate the total sales amount. In that case, it is possible to acquire the calculation result within short time by distributing the transaction data into multiple computers and by executing the calculation in a distributed manner on each of the computer.

Patent Literature 1 listed below describes a technique related to distributed computing technique. The technical problem of Patent Literature 1 is "To provide an access securing security to a resource in a distributed computer network". The solution to the problem of Patent Literature 1 is "This device includes a job ticket service 60 capable of storing a job ticket 61, in which the job ticket provides reference to a job, the job includes one or more resources, and a processor 80 accesses to the job ticket to execute the job, an authentication mechanism 94 capable of verifying the identification of a process trying to access to the job ticket, and an authorization mechanism 92 capable of receiving the identification from the authentication mechanism and providing authorization for accessing to the job ticket to the processor, wherein when the processor accesses to the job ticket, it accesses to one or more resources." (refer to Abstract).

Patent Literature 2 listed below describes a technique that controls accesses to data files located on networks. The technical problem of Patent Literature 2 is "To provide a technique that controls, when detecting a file operation on a terminal connected to a network, the operation by determining whether the operation is authorized". The solution to the problem of Patent Literature 2 is "An operation information acquirer 21 of a server S acquires operation information from a terminal C. An authorization requester 22 specifies an authorizer according to the acquired operation information, acquires authorizer information, and sends an authorization request to the specified authorizer. An authorization result receiver 23 receives authorization results from each authorizer, and passes the authorization results to an aggregator 24. The aggregator 24 acquires the authorizer information and the authorization result, and generates an aggregation result when a predetermined condition is satisfied. An authorization determinator 25 acquires the aggregation result from the aggregator 24, and determines whether or not to authorize according to the operation information and the aggregation result. A controller 26 executes a predetermined control according to the determination result by the authorization determinator 25." (refer to Abstract).

CITATION LIST

Patent Literature

Patent Literature 1: JP Patent Publication (Kokai) 2003-122540 A
Patent Literature 2: JP Patent Publication (Kokai) 2009-230257 A

SUMMARY OF INVENTION

Technical Problem

When executing operational jobs using computer resources that require authorizations for access, it is necessary to be authorized about using such computer resources before starting the operational job. In distributed computing environments, computer resources and operational jobs are both distributed. Thus it is assumed that each of the computer resources and each of the operational jobs require authorizations individually. This is an excessive burden for authorizers especially when the authorizer manually authorizes.

In the technique described in Patent Literature 1, a processor that accesses a job ticket is authenticated. The authenticated processor is provided with an access right. In this technique, each of the processors may be required to be authenticated individually. In addition, in Patent Literature 1, access rights for job tickets are automatically given to processors after passing the authentication process. Therefore, it may not be assumed that an authorizer individually authorizes each of job tickets.

In the technique described in Patent Literature 2, an authorizer authorizes accesses to files. However, distributed computing environments are not considered. In addition, if the technique described in Patent Literature 2 is introduced into distributed computing environments without modifications, it will be necessary to authorize each of operational jobs or each of computer resources individually. Thus burdens on the authorizer may be huge.

The present invention is made in the light of above-described technical problems. It is an objective of the present invention to decrease burdens of authorization processes when authorization is required to execute operational jobs using computer resources.

Solution to Problem

A job execution system according to the present invention groups multiple operational jobs, requests an authorization by unit of group, and handles all operational jobs included in the group as authorized if the group is authorized.

Advantageous Effects of Invention

With the job execution system according to the present invention, it is not necessary to authorize each of operational jobs individually. Thus it is possible to decrease burdens of authorization processes.

Technical problems, configurations, and effects other than described above will be understood with reference to the embodiments below.

BRIEF DESCRIPTION OF DRAWINGS

FIG. 2 is a diagram showing a configuration and a data example of an authorization request DB 240.

FIG. 3 is a diagram showing a configuration and a data example of an authorization result DB 250.

FIG. 4 is a diagram showing a configuration and a data example of a resource information DB 410.

FIG. 5 is a diagram showing a configuration and a data example of a division information DB 420.

FIG. 6 is a display image of an authorization request list screen 310 displayed by an authorizer terminal 300.

DESCRIPTION OF EMBODIMENTS

Embodiment 1

System Configuration

Figure 1:
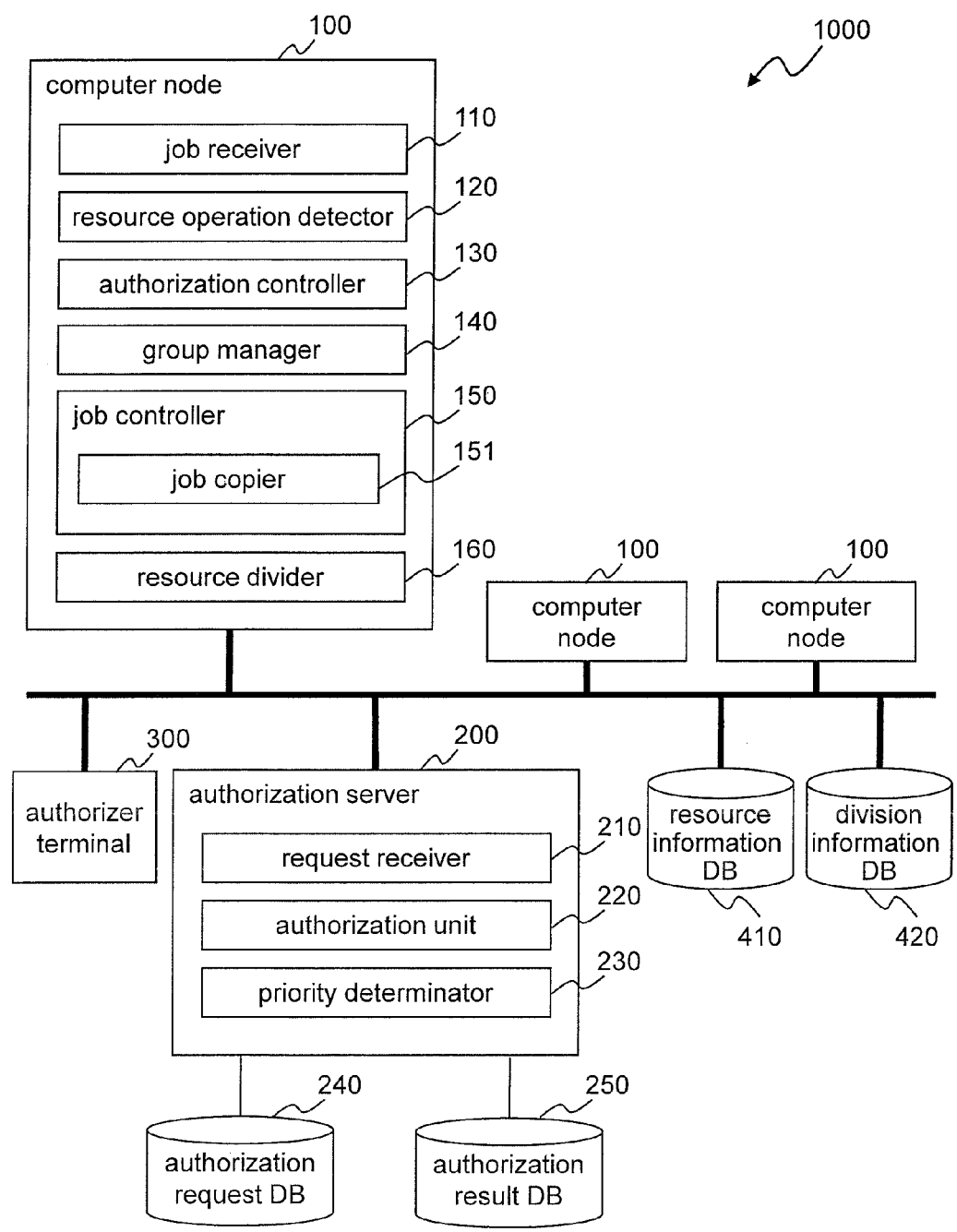
FIG. 1 is a configuration diagram of a job execution system 1000 according to an embodiment 1.

FIG. 1 is a configuration diagram of a job execution system 1000 according to an embodiment 1 of the present invention. The job execution system 1000 is a system that executes operational jobs using computer resources. The job execution system 1000 includes computer nodes 100, an authorization server 200, an authorizer terminal 300, a resource information database (DB) 410, and a division information database (DB) 420. They are connected to each other through a network.

The computer node 100 is a computer that executes operational jobs. There is a plurality of the computers 100. A user puts a job of a higher application (e.g. sales totalization job of accounting application) into the computer node 100. The computer node 100 into which the application job is inputted divides the application job into multiple operational jobs (e.g. totalization jobs for each of stores), and distributes the operational jobs to other computer nodes 100. Each of the computer nodes 100 executes the received operational jobs. Accordingly, multiple computer nodes 100 execute the application job in a shared manner.

The computer node 100 includes a job receiver 110, a resource operation detector 120, an authorization controller 130, a group manager 140, a job controller 150, and a resource divider 160.

The job receiver 110 receives the application job put by the user or operational jobs distributed from other computer node 100. The job receiver 110 determines the group to which the job belongs. Groups to which the job belongs will be described later. The job received by the job receiver 110 is executed by the job controller 150.

The resource operation detector 120 detects whether the job executed by the job controller 150 requires to access computer resources. The computer resources mentioned here may be such as data files or database tables used when executing operational jobs, or other computer nodes 100. Hereinafter, for the sake of convenience of description, an example is assumed where the computer resource is data files used when executing operational jobs. For example, in the example of accounting application, the data file accessed by operational jobs may be data files storing sales records of all stores.

When the resource operation detector 120 detects accesses to computer resources, the authorization controller 130 determines whether an authorization is required to access the computer resource. Methods for determination will be described later. If an authorization is required, the authorization controller 130 issues an authorization request to the authorization server 200. After the authorizer inputs an answer (authorization result) with respect to the authorization request, the authorization controller 130 receives the authorization result from the authorization server 200, and notifies the job controller 150 of the authorization result. There is a time lag from when the authorization request is generated to when the authorizer inputs the answer. Thus the authorization controller 130 cannot always acquire the answer to the authorization request immediately. However, as described later, if the authorizer has already inputted an answer to operational jobs belonging to the same group, the answer can be acquired immediately.

The group manager 140 groups multiple operational jobs, and assigns a same group ID to the grouped operational jobs. When distributing operational jobs belonging to a same group to multiple computer nodes 100, each of operational jobs received by each computer node 100 inherits the group ID of the group from the operational job before the distribution. The method for sharing the group ID between multiple operational jobs will be described later.

The job controller 150 generates and executes each operational job according to the application job received by the job receiver 110. Alternatively, the job controller 150 distributes operational jobs to other computer nodes 100, lets the other computer node 100 execute the distributed operational jobs, and receives the result thereof. In some cases, the job controller 150 receives operational jobs from other computer nodes 100. In this case, the job controller 150 executes that operational job. The method for the job controller 150 to execute each operational job will be described later.

The job controller 150 further includes a job copier 151. The job copier 151 is a functional unit that divides operational jobs by copying them. The copied operational jobs execute the same operational jobs as those of the original operational job. However, data files to be processed or the like are different from those of the original.

When the job controller 150 distributes operational jobs to other computer nodes 100, the resource divider 160 distributes, to the other computer nodes 100, computer resources that are accessed by the other computer nodes 100 for execution of the operational jobs. For example, if it is necessary to access data files in order to execute operational jobs, the resource divider 160 divides a portion of the data files accessed by the other computer nodes 100, and distributes the portion to the other computer nodes 100.

The authorization server 200 is a computer that receives authorization requests from the authorization controller 130 in the computer node 100, and that answers authorization results. The authorization server 200 authorizes accesses to computer resources by unit of group created by the group manager 140. The authorization server 200 includes a request receiver 210, an authorization unit 220, a priority determinator 230, an authorization request database (DB) 240, and an authorization result database (DB) 250.

The request receiver 210 receives authorization requests issued by the authorization controller 130, and searches an answer that is inputted for the authorization request from the authorization result DB 250. If no authorization result is found, the request receiver 210 stores the authorization request in the authorization request DB 240. If an authorization result is found, the request receiver 210 responds the authorization result to the authorization controller 130.

The authorization unit 220 sends, to the authorizer terminal 300, a list of authorization requests stored in the authorization request DB 240 in response to requests from the authorizer terminal 300. The authorization unit 220 receives, from the authorizer terminal 300, authorization results with respect to authorization requests. The authorization unit 220 stores the received authorization results in the authorization request DB 240. The authorization unit 220 aggregates the answers stored in the authorization request DB 240, determines a final authorization result with respect to the group, and stores the final authorization result in the authorization result DB 250. The final authorization result will be described later with FIG. 2. All operational jobs belonging to an authorized group are permitted to access computer resources that are used during jobs.

The priority determinator 230 determines priorities of authorization requests stored in the authorization request DB 240. The priority is an indicator for determining the sequence to process authorization requests. The authorizer may refer to the priority to perform authorization processes. In such a case where multiple authorizers are required to be involved, the priority of authorization request could be higher as the number of authorizers to be involved becomes larger.

The authorization request DB 240, the authorization result DB 250, the resource information DB 410, and the division information DB 420 will be described with FIGS. 2-5 later.

The authorizer terminal 300 is a terminal for the authorizer to input answers to authorization requests. The authorizer terminal 300 inquires the authorization server 200 whether there are authorization request that are not answered. The authorizer terminal 300 displays a list of authorization requests on a screen described with FIG. 6 later. The authorizer inputs answers on the screen. The authorization server 200 receives the answer and stores it in the authorization request DB 240.

Each of the functional units included in each of the computers may be configured as hardware implementing these functions, or may be configured using processors such as CPU (Central Processing Unit) executing programs implementing these functions.

FIG. 2 is a diagram showing a configuration and a data example of the authorization request DB 240. The authorization request DB 240 is a database that stores non-answered authorization requests. The authorization DB 240 can be configured by storing data files holding data in storage devices such as HDD (Hard Disk Drive). Although FIG. 2 shows a configuration in table format, other formats may be allowed. The method for configuring databases and data formats are the same for other databases. Thus such descriptions will be omitted for the databases described later.

The authorization request DB 240 includes a group ID field 241, a representative job ID field 242, a resource ID field 243, a requester field 244, an authorizer ID field 245, an answer field 246, a resource ID before division field 247, an operator ID field 248, and an application job ID field 249. Each of records in the authorization request DB 240 corresponds to an authorization request. The authorizer terminal 300 acquires records stored in the authorization request DB 240, and displays the acquired records on the screen described with FIG. 6 later.

The group ID field 241 stores group IDs created by the group manager 140. The representative job ID field 242 stores operational job IDs that represent groups identified by the group ID field 241. The resource ID field 243 stores IDs of computer resources that are accessed to execute operational jobs included in the group identified by the group ID field 241 and that are required to be authorized before accessed. The requester field 244 stores information that identifies the computer node 100 that issued the authorization request. The example shows IP address and port number as such information. The authorizer ID field 245 stores IDs of authorizers that are to answer to the authorization request.

The answer field 246 stores answers that are inputted by the authorizer on the authorizer terminal 300. This field is provided in addition to the authorization result DB 250 because there could be multiple authorizers.

Thus in the embodiment 1, the authorization result inputted from the authorizer terminal 300 is stored in the authorization result DB 240, and the authorization unit 220 determines the final authorization result for a group at the time when a certain amount of authorization results (not necessarily all results) regarding operational jobs belonging to the group is stored in the DB. For example, the final authorization result for the group may be determined by a vote of authorization results with respect to operational jobs belonging to the same group. Other appropriate methods may be employed. The authorization unit 220 stores the final authorization result for the group in the authorization result DB 250.

The resource ID before division field 247 stores IDs of resources before division if the computer resource identified by the resource ID field 243 is created by the resource divider 160. This field may be acquired from the division information DB 420 described later. Thus it is not always necessary to provide this field in the authorization request DB 240.

The operator ID field 248 is an ID of user who puts the application job from which operational jobs belonging to each group are created. The application job ID field 249 is an ID of the application job.

When receiving a request to send a list of authorization requests from the authorizer terminal 300, the authorization unit 220 searches the authorization request DB 240 using the authorizer ID as a search key to acquire the list of authorization requests to which the authorizer should input answers. The authorization unit 220 creates an authorization request list for responding to the authorizer terminal 300 according to the following process. This avoids redundantly requesting answers with respect to the same authorization request.

(Authorization Request List Creation Process No. 1)

Regarding authorization requests to which answers have already been inputted in the answer field 246, it is not necessary to present such authorization requests on the authorizer terminal 300. Thus the authorization unit 220 excludes such authorization requests from the authorization request list that is responded to the authorizer terminal 300.

(Authorization Request List Creation Process No. 2)

Regarding authorization requests that belong to the same group as authorization requests to which answers have already been inputted in the answer field 246, and that access the same resource to be authorized (the resource ID field 243 if not divided, and the resource ID before division field 247 if divided), it is assumed that the authorizer would input the same authorization result for those authorization requests. Thus the authorization unit 220 excludes such authorization requests from the authorization request list that is responded to the authorizer terminal 300.

(Authorization Request List Creation Process No. 3)

If there are multiple non-answered authorization requests that belong to the same group and that have the same resource ID field 243, only one of them will be saved and other authorization requests will be deleted from the authorization request DB 240. This is because the authorizer would input the same answer to these authorization requests. In addition, the same authorization result will be applied to all operational jobs belonging to the same group if an authorization is acquired for entire of the group as described later. Thus it is sufficient if an answer is acquired to any one of authorization requests belonging to the same group.

FIG. 3 is a diagram showing a configuration and a data example of the authorization result DB 250. The authorization result DB 250 is a database that stores final authorization results for groups of operational jobs. The authorization result DB 250 includes a group ID field 251, a resource ID field 252, and an authorization result 253.

The group ID field 251 stores IDs of groups for which the authorization unit 220 finally determines authorization results. This field corresponds to the group ID field 241. The resource ID field 252 stores IDs of computer resources that are accessed by operational jobs included in the group identified by the group ID field 251. This field corresponds to the resource ID field 243 if not divided and to the resource ID before division field 247 if divided. The authorization result 253 stores final authorization results for groups identified by the group ID field 251.

FIG. 4 is a diagram showing a configuration and a data example of the resource information DB 410. The resource information DB 410 is a database that lists computer resources which require authorizations before access and that specifies authorizers for those computer resources. The resource information DB 410 includes a resource ID field 411 and an authorizer ID field 412.

The resource ID field 411 stores IDs of computer resources that require authorizations before access. The authorizer ID field 412 stores IDs of authorizers who authorize accesses to computer resources identified by the resource ID field 411.

The authorization controller 130 in the computer node 100 issues authorization requests to the authorization server 200. The authorization unit 220 specifies authorizers who are to answer to the authorization requests.

FIG. 5 is a diagram showing a configuration and a data example of the division information DB 420. The division information DB 420 is a database that manages relationships between before and after division of computer resources if the resource divider 160 divided the computer resources. The division information DB 420 includes a group ID field 421, a resource ID after division field 422, and a resource ID before division field 423.

The group ID field 421 is an ID of group to which an operational job using computer resources belongs. The resource ID after division field 422 is an ID of computer resource created by the resource divider 160 among computer resources that are used by operational jobs belonging to the group identified by the group ID field. The resource ID before division field 423 is an ID of computer resource from which the resource divider 160 divides the computer resource identified by the resource ID after division field 422.

When distributing divided computer resources to other computer nodes 100, the resource divider 160 stores the relationship between before and after the division in the division information DB 420. The resource ID before division field 247 in the authorization request DB 240 may be derived from information stored in the division information DB 420.

If an operational job uses a computer resource after division, it is necessary for the authorizer to determine whether the access to the computer resource after division is permitted. However, the computer resource ID after division may be different from that of before division. Thus it may not be possible to determine the permission only by the computer resource ID. In such cases, the relationship between computer resource IDs before and after division may be acquired from the division information DB 420, and the computer resource ID after division could be replaced into that of before division to present it for the authorizer. The security levels required for the computer resources before and after division may be approximately the same. Therefore, it is sufficient for the authorizer to perform the authorization process if the permission of the computer resource before division can be determined.

FIG. 6 is a display image of an authorization request list screen 310 displayed by the authorizer terminal 300. The authorization request list screen 310 is a screen that displays a list of authorization requests stored in the authorization request DB 240. The authorization request list screen 310 includes an authorization request table 311, an update button 312, a permission button 313, and a dismissal button 314.

When performing authorization processes, the authorizer displays the authorization request list screen 310 on a display of the authorizer terminal 300. At this time, the ID of the authorizer is specified. For example, a login ID of the authorizer may be used. The authorizer terminal 300 inquires non-answered authorization requests to the authorization server 200 using the authorizer ID.

The authorization unit 220 creates an authorization request list related to the authorizer from the authorization request DB 240 according to the method described with Authorization request list creation processes No. 1-No. 3. The authorization unit 220 sends the list to the authorizer terminal 300. The authorizer terminal 300 displays the authorization requests list on the authorization request table 311. It is not always necessary to display all fields included in the authorization request DB 240. Only the information required for the authorizer to perform the authorization process may be displayed. The priority determinator 230 may determine the priority according to the above-described method and may notify the authorizer terminal 300 of the priority. The screen may display it.

The authorizer inputs the answer to the authorization request by pressing the permission button 313 or the dismissal button 314. When retrieving the authorization request list from the authorization server 200 again, the authorizer presses the update button 312. The authorization server 200 receives the answer inputted by the authorizer from the authorizer terminal 300, and stores it in the answer field 246 in the authorization request DB 240. The process after it is as described above.

Embodiment 1

Regarding Job Group

Figure 7:
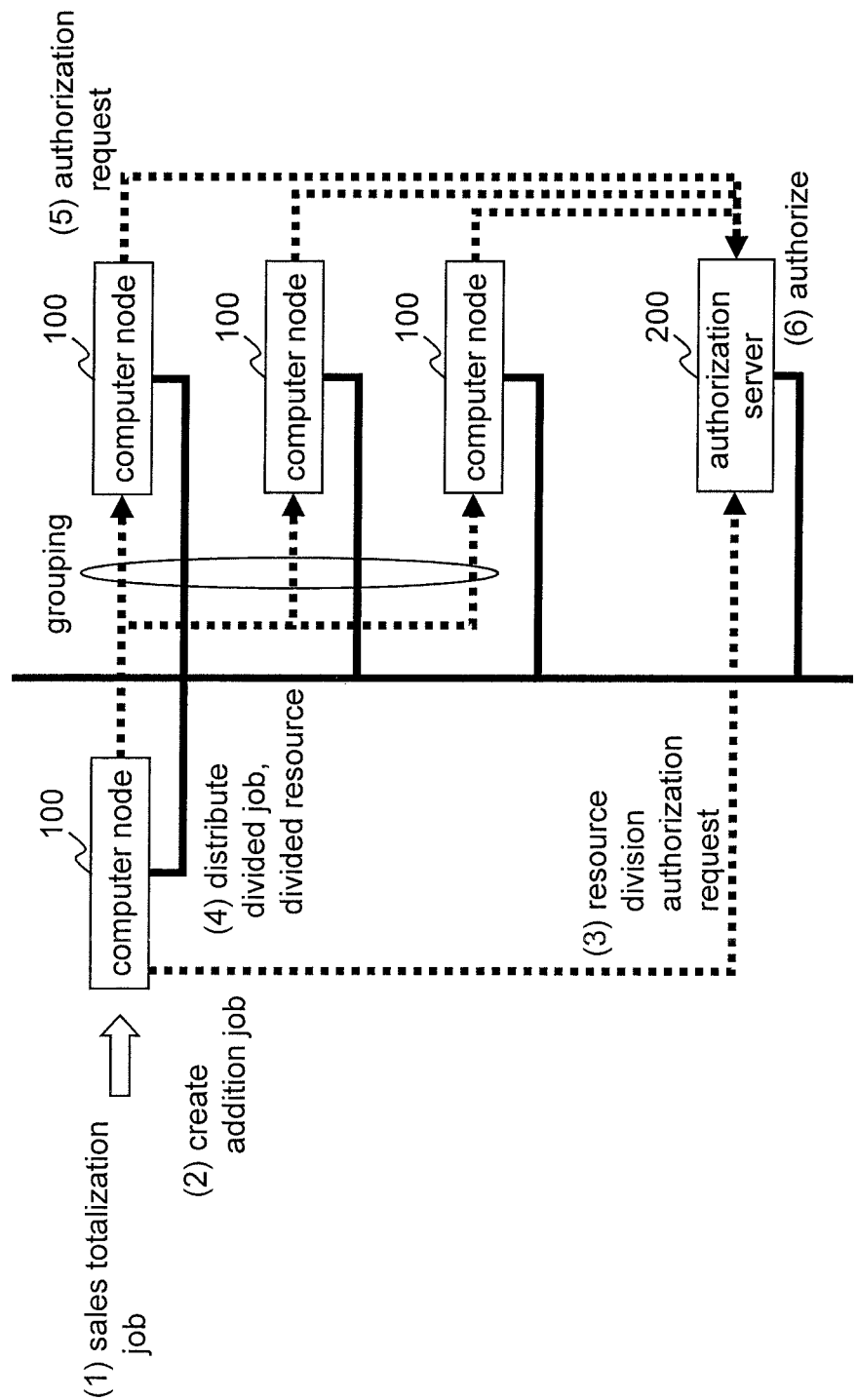
FIG. 7 is a diagram showing an authorization with respect to a job group created by a group manager 140 and all job groups.

FIG. 7 is a diagram showing an authorization with respect to a job group created by the group manager 140 and all job groups. The example shows a flow from when a user puts an application job to when each computer node issues authorization requests. Hereinafter, each step in FIG. 7 will be described.

(FIG. 7: Step 1: Sales Totalization Job)

The user puts the application job into a computer node 100 through an upper application. It is assumed here that a sales totalization job for all stores of an accounting application is put.

(FIG. 7: Step 2: Create Addition Job)

The job controller 150 replaces the sales totalization job put by the user with operational jobs executed by computers. Regarding the sales totalization job, operational jobs such as adding sales records of each store may be created. Hereinafter, for the sake of convenience, such example will be used.

(FIG. 7: Step 3: Request Resource Division Authorization)

If the processing load of the operational jobs is large, the job controller 150 divides the operational jobs created in step 2 and assigns the divided jobs to other computer nodes 100. The group manager 140 groups the operational jobs before and after division, assigns a same group ID, and passes the group ID to each operational job as a parameter. Alternatively, some database may administer the group to which each operational job belongs. It is also necessary to distribute computer resources that are used by the operational jobs after division. In this example, the data file describing the sales record is divided for each store, and the divided data file is distributed to the computer node 100 that handles the related store. When dividing the data file, an access occurs to the data file. The resource operation detector 120 detects that access. The authorization controller 130 issues, to the authorization server 200, an authorization request for the access. The authorizer answers to the authorization request using the authorizer terminal 300. The authorization unit 220 stores the final authorization result for the group into the authorization result DB 250.

(FIG. 7: Step 4: Distribute Divided Jobs)

The job controller 150 distributes the divided operational jobs to each computer node 100.

(FIG. 7: Step 4: Distribute Divided Resources)

The resource divider 160 distributes the divided computer resources to corresponding computer nodes 100. At this time, the relationship between the group ID to which corresponding operational jobs belong and the computer resource IDs before and after division is stored in the division information DB 420.

(FIG. 7: Step 5: Authorization Request)

The job controller 150 of each computer node 100 executes the received operational jobs. During this process, the resource operation detector 120 detects accesses to computer resources after division. The authorization controller 130 issues, to the authorization server 200, an authorization request regarding the access permission to the computer resource. The group ID to which the operational job after division belongs is also notified to the authorization server 200.

(FIG. 7: Step 6: Authorize)

The authorization unit 220 searches the authorization result DB 250 using the group ID related to the authorization request as a search key. In the process flow shown in FIG. 7, an authorization result is already stored for the group in step 3. Thus the authorization unit 220 answers to the authorization request using it. This eliminates the necessity for the authorizer to individually input answers with respect to the authorization requests that are created from divided jobs. Thus burdens for the authorizer can be reduced. The job controller 150 in each computer node 100 executes each operational job if an authorization result is acquired indicating that the access to the computer resource is permitted for the group. The job controller 150 stops executing the job if an authorization result is acquired indicating that the access is not permitted.

Embodiment 1

Summary

As discussed thus far, the job execution system 1000 according to the embodiment 1 groups each operational job and assigns a same group ID when dividing operational jobs to distribute them to each computer node 100. Each computer node 100 issues an authorization request to the authorization server 200 when executing operational jobs after division. The authorization server 200 answers an authorization result for the group. Each computer node 100 controls the operational job according to the authorization result. According to such configuration, the authorizer does not have to individually answer to authorization requests created from divided jobs once after answering to an authorization request for a group. Thus it is possible to reduce burdens on the authorizer.

Embodiment 2

In the embodiment 1, the group manager 140 groups multiple operational jobs. The frequency or target of the authorization request differs depending on the range by which the operational job is grouped. In an embodiment 2 of the present invention, various configuration examples will be described regarding the range of grouped operational jobs. In addition, detailed operations of the job execution system 1000 will also be described. Other configurations are the same as those of the embodiment 1.

Figure 8:
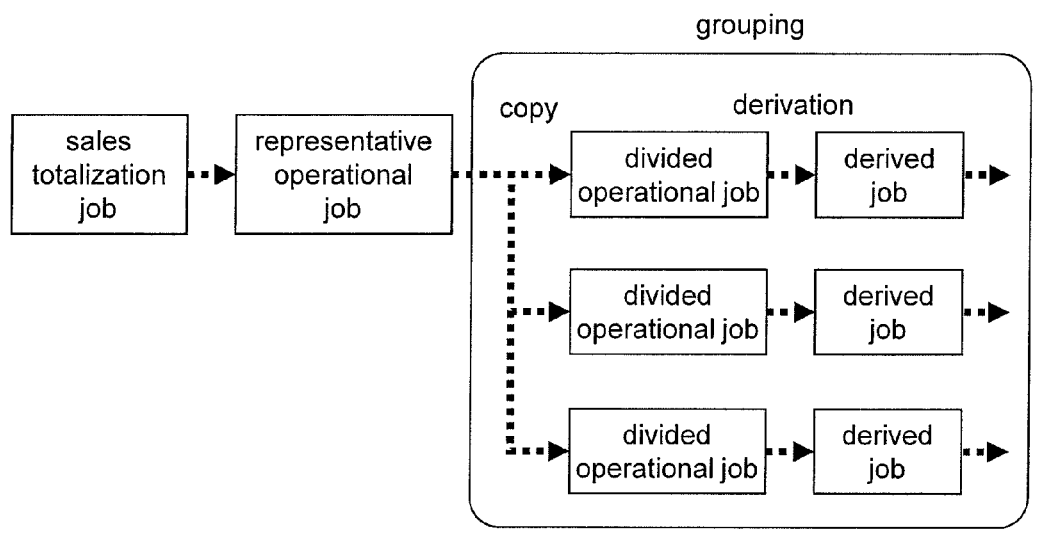
FIG. 8 is a diagram showing an example where a divided job generated by copying an operational job and an operational job derived from the divided job belong to a same group.

FIG. 8 is a diagram showing an example where a divided job generated by copying an operational job and an operational job derived from the divided job belong to a same group. The job copier 151 copies a representative operational job created from an application job, thereby creating divided operational jobs. In the divided operational jobs, derived jobs may be created that handle portions of the divided operational jobs.

In the example shown in FIG. 8, the representative operational job and the divided operational jobs belong to different groups from each other. Thus the authorization result for the representative operational job is not applied to the divided operational jobs. This is advantageous when it is not desired to let the divided operational jobs inherit the authorization result for the representative operational job.

In the example shown in FIG. 8, the jobs created by copy belong to a new group if the original job does not belong to any group. The jobs created by copy belong to the group to which the original job belongs if the original job belongs to the group. The jobs created by methods other than copy belong to the group to which the original job belongs.

Figure 9:
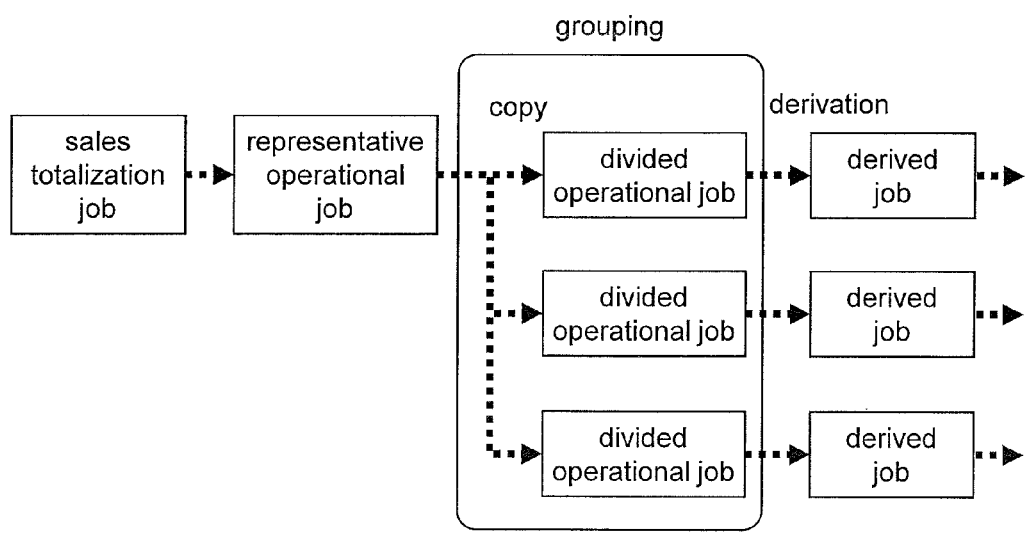
FIG. 9 is a diagram showing an example where a divided job generated by copying an operational job and an operational job derived from the divided job belong to different groups.

FIG. 9 is a diagram showing an example where a divided job generated by copying an operational job and an operational job derived from the divided job belong to different groups. If the authorizer does not know the contents of derived jobs derived from divided operational jobs, the authorizer would not necessarily authorize the authorization requests from the derived jobs even when authorizing the authorization requests from the divided operational jobs. In such cases, it is desirable if the divided operational jobs and the derived jobs belong to different groups from each other.

In the example shown in FIG. 9, the jobs created by copy belong to the group created by the original job. The jobs created by methods other than copy do not belong to any group.

Figure 10:
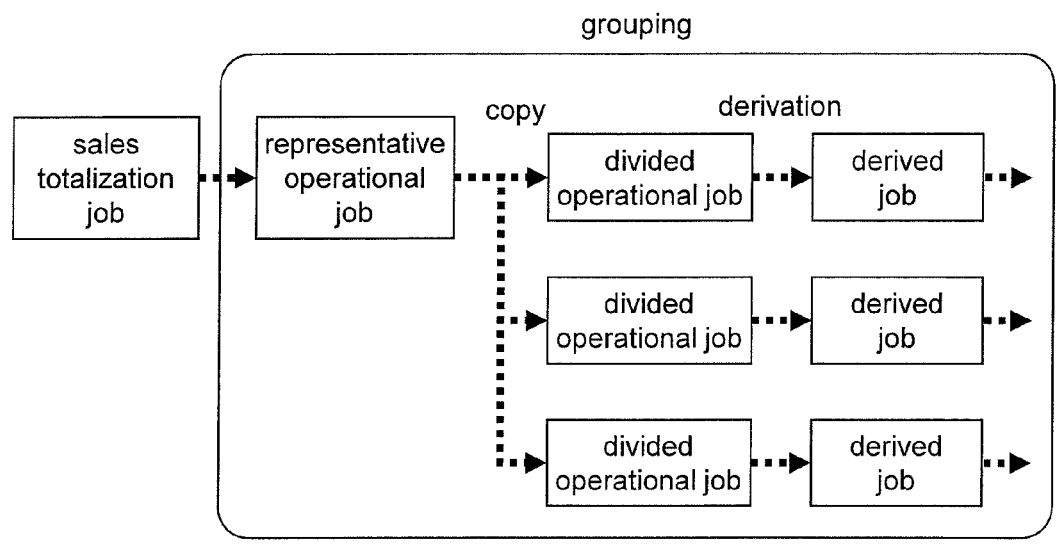
FIG. 10 is a diagram showing an example where operational jobs before and after division belong to a same group.

FIG. 10 is a diagram showing an example where operational jobs before and after division belong to a same group. This corresponds to the group structure described in the embodiment 1. If it is desired to authorize operational jobs before and after division collectively, the group structure shown in FIG. 10 is advantageous. The group structure is also advantageous if it is desired to inherit the authorization result with respect to operational jobs before division for the sake of operational jobs after division.

In the example shown in FIG. 10, the jobs created by copy belong to the group to which the original job belongs. The jobs created by methods other than copy also belong to the group to which the original job belongs.

Figure 11:
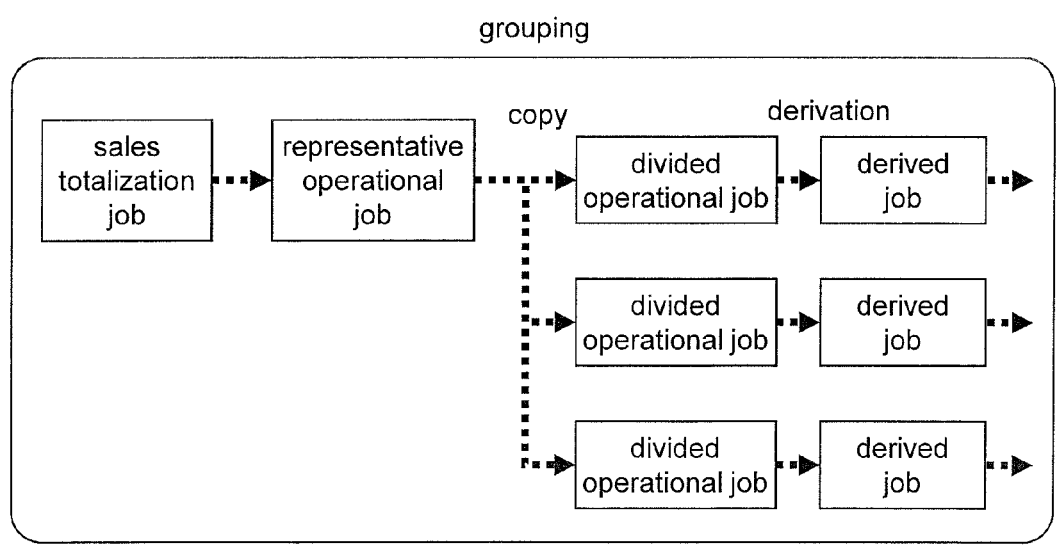
FIG. 11 is a diagram showing an example where an application job and an operational job belong to a same group.

FIG. 11 is a diagram showing an example where an application job and an operational job belong to a same group. If the authorizer wishes to start the authorization process from the application job, the group structure shown in FIG. 11 is advantageous.

In the example shown in FIG. 11, the jobs created by copy belong to the group to which the original job belongs. The jobs created by methods other than copy also belong to the group to which the original job belongs.

Figure 12:
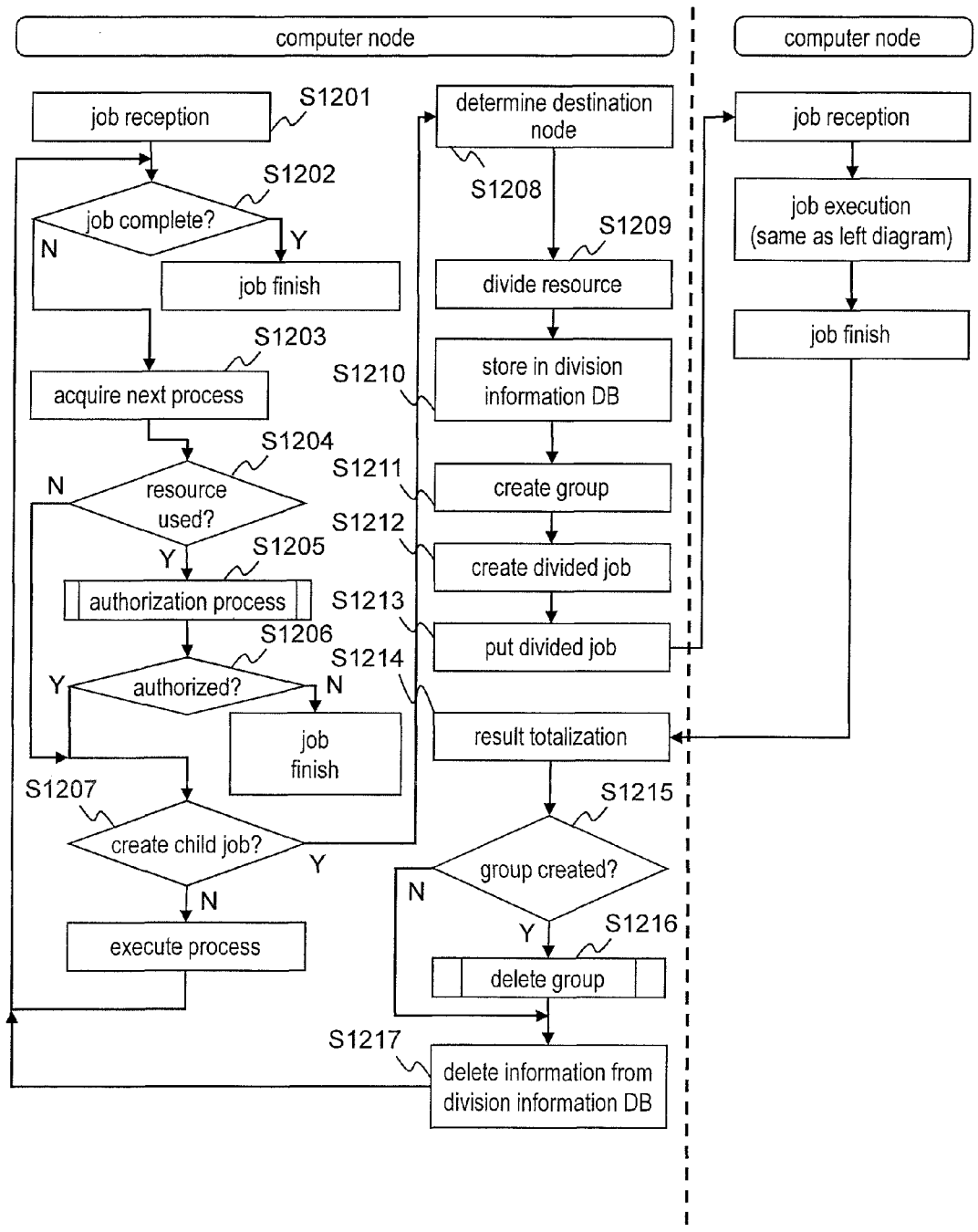
FIG. 12 is a diagram showing an operational flow of the job execution system 1000 when the group manager 140 employs the group structures shown in FIGS. 8-10.

FIG. 12 is a diagram showing an operational flow of the job execution system 1000 when the group manager 140 employs the group structures shown in FIGS. 8-10. The example shows that a divided job is distributed between two computer nodes 100. Hereinafter, each step in FIG. 12 will be described.

(FIG. 12: Step S1201)

If a user puts an application job into the computer node 100, or if other computer node 100 distributes an operational job, the job receiver 110 receives the job. The job receiver 110 determines, according to such as the argument parameters, the group to which the received job belongs.

(FIG. 12: Steps S1202-S1203)

If the job reaches the completed stage, the job is finished. If there still are steps to be executed, the flowchart proceeds to step S1203 (S1202). The job controller 150 acquires the next step of operational job to be executed (S1203).

(FIG. 12: Step S1204)

The resource operation detector 120 determines whether the next step to be executed uses computer resources that require authorization for access. If the next step uses such computer resources, the flowchart proceeds to step S1205 to execute the process flow described with FIG. 14 later. If the next step does not use such computer resources, the flowchart skips to step S1207.

(FIG. 12: Step S1206)

The authorization controller 130 receives, from the authorization server 200, an authorization result regarding whether it is permitted to use the computer resources. If the received authorization result indicates that using the computer resources is permitted, the flowchart proceeds to step S1207. If the received authorization result indicates that using the computer resources is not permitted, the operational job being executed by the job controller 150 currently is finished with error.

(FIG. 12: Step S1207)

The job controller 150 determines whether child jobs (divided jobs) are necessary to be created in order to execute the operational job in cooperation with other computer node 100. This determination may be performed according to the anticipated processing load of the operational job, or may be designated by the user manually. If child jobs will be created, the flowchart proceeds to step S1208. If not, the process acquired in step S1203 is executed and the flowchart returns back to step S1202.

(FIG. 12: Steps S1208-S1210)

The job controller 150 determines the computer node 100 to which the job controller 150 requests to execute the divided job (S1208). The resource divider 160 divides the computer resource for which the authorization request is issued in step S1205, and distributes the divided computer resource to the computer node 100 which is requested to execute the divided job (S1209). The resource divider 160 stores the relationship between the computer resources before and after division into the division information DB 420 (S1210).

(FIG. 12: Steps S1211-S1213)

The group manager 140 creates a group to which the divided job belongs, and assigns a group ID (S1211). The job controller 150 creates the divided job by such as copying the operational job, and associates the divided job with the group ID (S1212). The divided job inherits the group ID. The job controller 150 distributes the divided job to other computer node 100, and requests the other computer node 100 to execute the distributed divided job (S1213).

(FIG. 12: Steps S1211-S1213: Additional Node No. 1)

If an attacker knows the group ID to which the divided job belongs, the attacker may illegally access the computer resource using the group ID. Methods for preventing such illegal accesses could be such as: the group ID may be generated using random numbers in step S1211; the group ID may be encrypted when sending to other computer node 100; or the like.

(FIG. 12: Steps S1211-S1213: Additional Node No. 2)

The computer node 100 to which the divided job is distributed executes the same process as in steps S1201-S1217. In other words, if the divided job is further divided, the processes after S1207 are performed. If the divided job is not further divided, the child job is not created in step S1207 and the divided job is executed alone.

(FIG. 12: Steps S1214-S1217)

The job controller 150 aggregates the result of divided jobs executed by each of the computer nodes 100, and totalizes the aggregated result (S1214). The process flow described with FIG. 16 later is executed in step S1216 if a new group is created in step S1211, otherwise the flowchart skips to step S1217 (S1215). The resource divider 160 deletes the information stored in the division information DB 420 in step S1210 (S1217).

Figure 13:
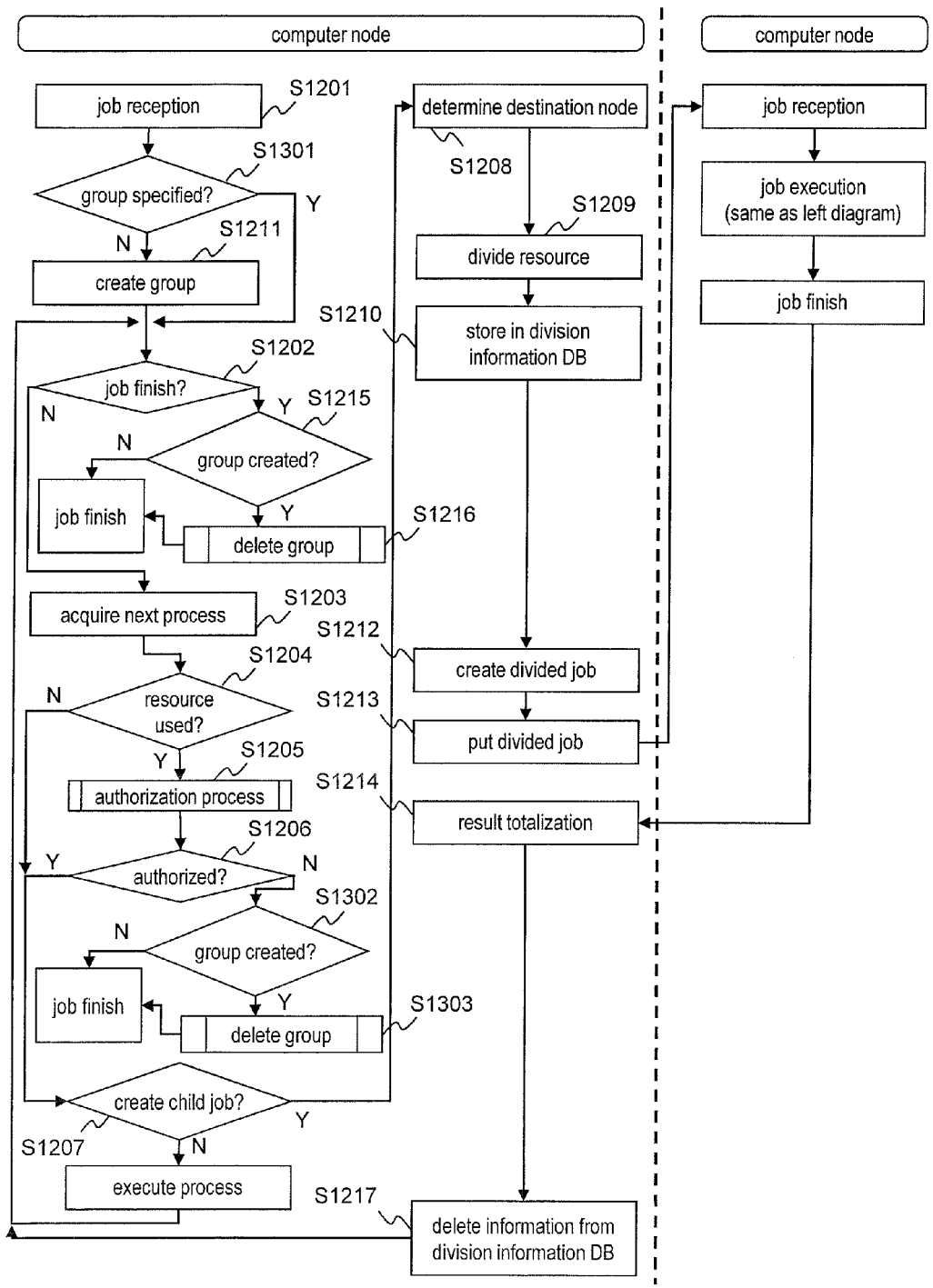
FIG. 13 is a diagram showing an operational flow of the job execution system 1000 when the group manager 140 employs the group structure shown in FIG. 11.

FIG. 13 is a diagram showing an operational flow of the job execution system 1000 when the group manager 140 employs the group structure shown in FIG. 11. Hereinafter, each step in FIG. 13 will be described. Although the same steps as in FIG. 12 have the same reference signs, the sequence of steps is different from FIG. 12. Hereinafter, the difference from FIG. 12 and new additional steps will be mainly described.

(FIG. 13: Step S1301)

After the job receiver 110 receives the job, the group manager 140 determines whether the group to which the job belongs is specified by such as parameters. When the user initially puts the application job, the group to which the application job belongs has not been created. Thus a new group is created in step S1211. When receiving jobs after operational jobs created from the application job, the group to which the original application job belongs has already been created. Thus the flowchart skips to step S1202.

(FIG. 13: Step S1202)

This step is similar to that of FIG. 12. However, this step is different from FIG. 12 in that steps S1215-S1216 are performed after this step. Since the group structures of FIGS. 8-10 are employed in FIG. 12, the group may be deleted after completing all operational jobs. On the other hand, in FIG. 13, the application job may not be completed even after the operational jobs are completed. Thus the group is deleted immediately before finishing the job.

(FIG. 13: Step S1206)

This step is similar to that of FIG. 12. However, this step is different from FIG. 12 in that steps S1302-S1303 are performed after this step. These steps are the same as steps S1215-S1216. For the same reason as in step S1202, the group is deleted immediately before finishing the job with error.

(FIG. 13: Step S1210)

Since the group is created immediately after receiving the job in FIG. 13, the flowchart proceeds to step S1212 after this step. The subsequent steps are the same as in FIG. 12. However, the group is deleted immediately after step S1202 and immediately after S1206 as mentioned above.

Figure 14:
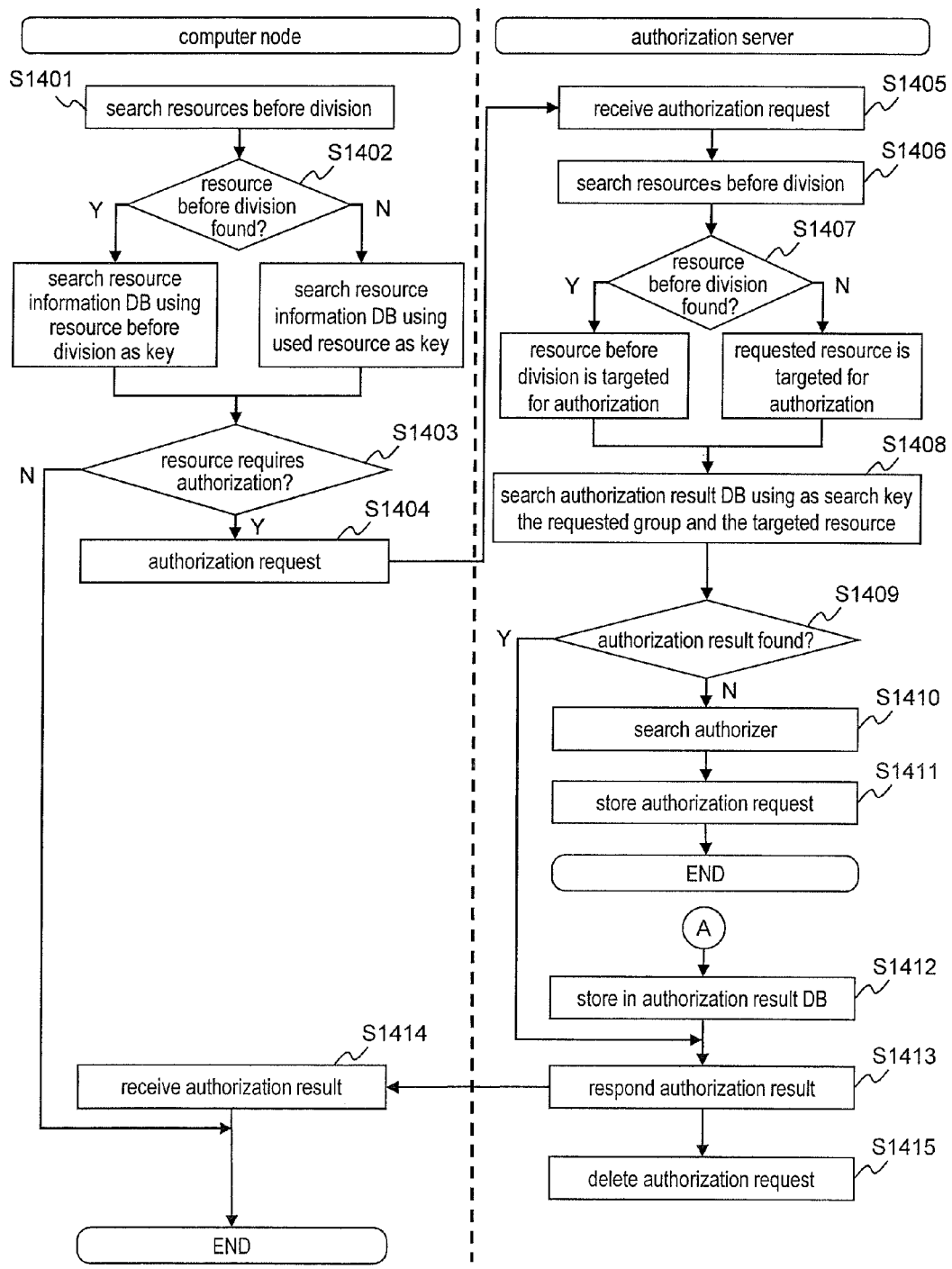
FIG. 14 is a diagram showing details of step S1205.

FIG. 14 is a diagram showing details of step S1205. Hereinafter, each step in FIG. 14 will be described.

(FIG. 14: Step S1401)

In order to check whether there is computer resource before division from which the computer resource related to the authorization request is created, the authorization controller 130 in the computer node 100 searches the division information DB 420 using the computer resource ID as a search key.

(FIG. 14: Step S1402)

If a resource before division is found in step S1401, the authorization controller 130 searches the resource information DB 410 using the resource before division as a search key. If no resource before division is found in step S1401, the authorization controller 130 searches the resource information DB 410 using the computer resource related to the authorization request as a search key.

(FIG. 14: Step S1403-S1404)

If a record is found in the resource information DB 410 in step S1402, the authorization controller 130 determines that an authorization is required when accessing the computer resource, and issues an authorization request to the authorization server 200 in step S1404. If no record is found in the resource information DB 410, no authorization is necessary to access the computer resource. Thus the flowchart terminates.

(FIG. 14: Step S1405-S1407)

The request receiver 210 in the authorization server 200 receives the authorization request (S1405). The authorizer 220 executes the same process as steps S1401-S1402. If a resource before division is found, the group related to the resource before division will be the target for the authorization. If no resource before division is found, the group related to the authorization request will be the target for the authorization (S1406-S1407).

(FIG. 14: Step S1408-S1409)

The authorization unit 220 searches the authorization result DB 250 using, as a search key, the group to which the operational job related to the authorization request belongs and the computer resource configured as the authorization target in step S1407 (S1408). If corresponding authorization results are found, the flowchart proceeds to step S1412. If no authorization result is found, the flowchart proceeds to step S1410 (S1409).

(FIG. 14: Step S1410-S1411)

If no record is found in the authorization result DB 250 in step S1408, the authorization unit 220 determines that the authorization request is not answered yet, and searches the authorizer from the resource information DB 410 who should answer to the authorization request (S1410). The authorizer 220 stores the authorization request in the authorization request DB 240 along with the authorizer specified in step S1410 (S1411). If there are multiple corresponding authorizers, the record is stored for each of the authorizers.

(FIG. 14: Step S1412)

This step continues from the point A described in FIG. 15 later. The authorization unit 220 determines the final authorization result with respect to the authorization result using the above-described method, and stores the authorization result in the authorization result DB 250.

(FIG. 14: Step S1413-S1414)

The authorization unit 220 responds, to the computer node 100, the final authorization result stored in the authorization result DB 250 (S1413). The authorization controller 130 in the computer node 100 receives the authorization result (S1414).

(FIG. 14: Step S1415)

The authorization unit 220 searches the authorization request DB 240 using, as a search key, the group ID 251 and the resource ID 252 of the final authorization result stored in the authorization result DB 250. The authorization unit 220 deletes the corresponding record in the authorization result DB 240. Specifically, not only the resource ID 243 but also the resource ID before division 247 is searched using the resource related to the authorization result as a search key. The records matched with the search key are deleted.

Figure 15:
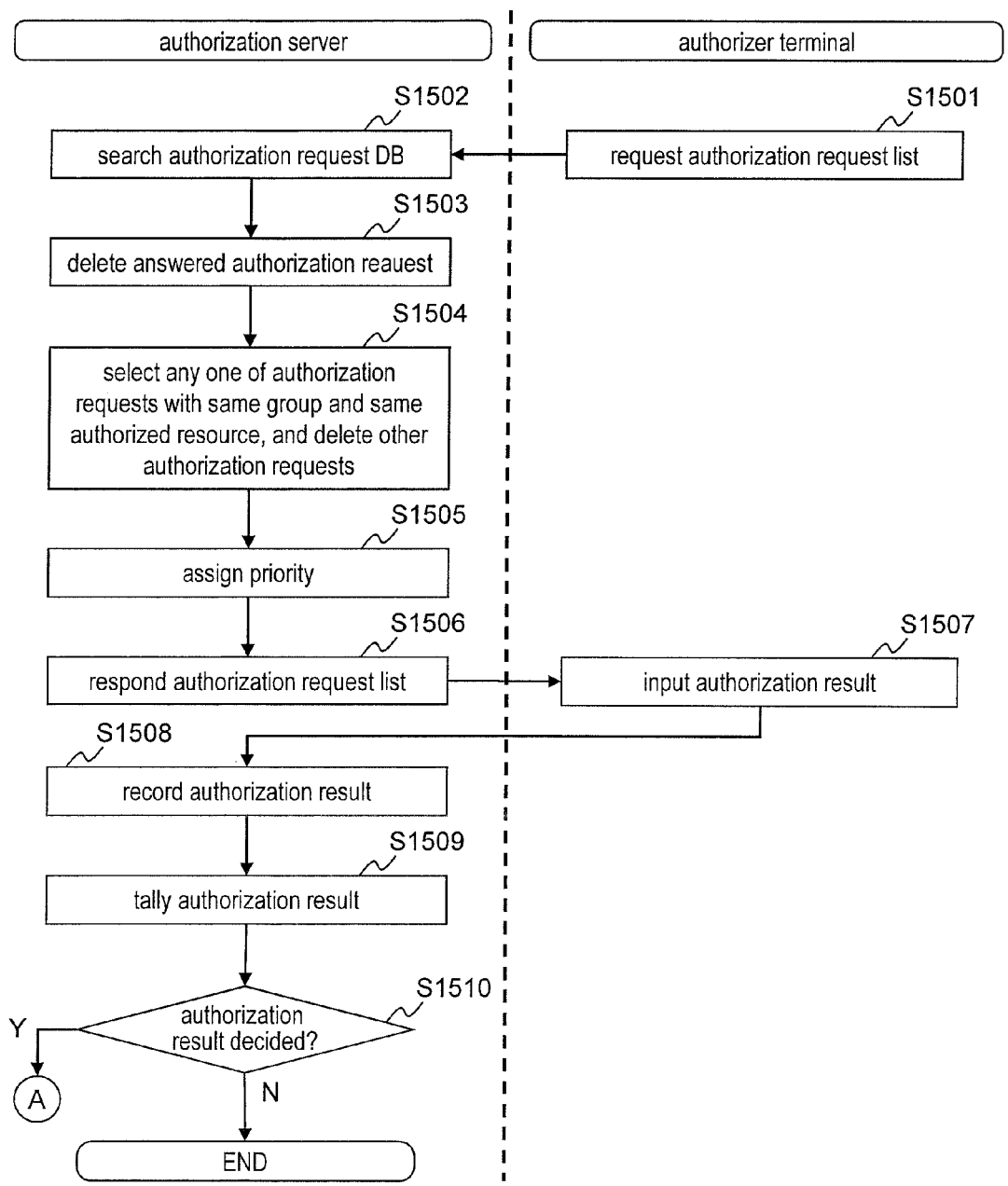
FIG. 15 is a diagram showing a process where an authorizer inputs an answer to an authorization request using the authorizer terminal 300.

FIG. 15 is a diagram showing a process where an authorizer inputs an answer to an authorization request using the authorizer terminal 300. Hereinafter, each step in FIG. 15 will be described.

(FIG. 15: Steps S1501-S1502)

The authorizer terminal 300 requests the authorization server 200 to send a list of non-answered authorization requests (S1501). The authorization unit 220 searches the authorization requests DB 240 using the authorizer ID as a search key to acquire the corresponding authorization request list (S1502).

(FIG. 15: Steps S1503)

The authorization unit 220 deletes answered authorization requests in the authorization request list acquired in step S1502. Specifically, authorization requests in which the answer field 246 is already inputted are deleted. Then authorization requests are deleted in which the group ID field 241 and the resource ID field 243 are the same as those of answered authorization requests.

(FIG. 15: Steps S1503: Additional Note)

When creating the authorization request list, if there is an authorization request with respect to resources divided from the same resource and if any one of the divided resource has already acquired an answer, the authorization unit 220 determines that the divided resources divided from the same resource have already acquired the answer. In other words, jobs are grouped using not only a pair of the group ID field 241 and the resource ID field 243 but also a pair of the group ID field 241 and the resource ID before division field 247. If any one of the grouped jobs has already acquired an answer, all jobs in the group are determined to have also already acquired the answer.

(FIG. 15: Steps S1504)

The authorization unit 220 keeps any one of the authorization requests not deleted in step S1503 having the same values of the group ID field 241 and the resource ID field 243, and deletes other ones of those authorization requests.

(FIG. 15: Steps S1504: Additional Note)

When creating the authorization request list, the authorization requests having the same resource before division are grouped. In other words, any one of records grouped by a pair of the group ID field 241 and the resource ID field 243 is selected, and then any one of records grouped by a pair of the group ID field 241 and the resource ID before division field 247 is selected, thereby reducing the number of records. Specifically, any one of records grouped by a pair of the group ID field 241 and the resource ID field 243 is selected, and then any one of records grouped by a pair of the group ID field 241 and the resource ID before division field 247 is selected, any one of the selected records is further selected, thereby reducing the number of records.

(FIG. 15: Steps S1505-S1506)

The priority determinator 230 determines, for the authorization requests not deleted in step S1504, a priority with which the authorizer answers, and assigns the priority for each of those authorization requests (S1505). The authorization unit 220 sends, to the authorizer terminal 300, a list of authorization requests with those priorities (S1506).

(FIG. 15: Steps S1507-S1508)

The authorizer inputs answers to the authorization requests on the authorization request list screen 310 described with FIG. 6 (S1507). The authorization unit 220 receives the answers, and stores the answers into the answer field 246 of the authorization request DB 240 (S1508).

(FIG. 15: Steps S1509-S1510)

The authorization unit 220 tallies the answer fields 246 inputted by the authorizers, and determines the final authorization result using the above-described method (S1509). The flowchart proceeds to the point A in FIG. 14 if the final authorization result can be decided from the totalized authorization result, otherwise the flowchart terminates (S1510).

Figure 16:
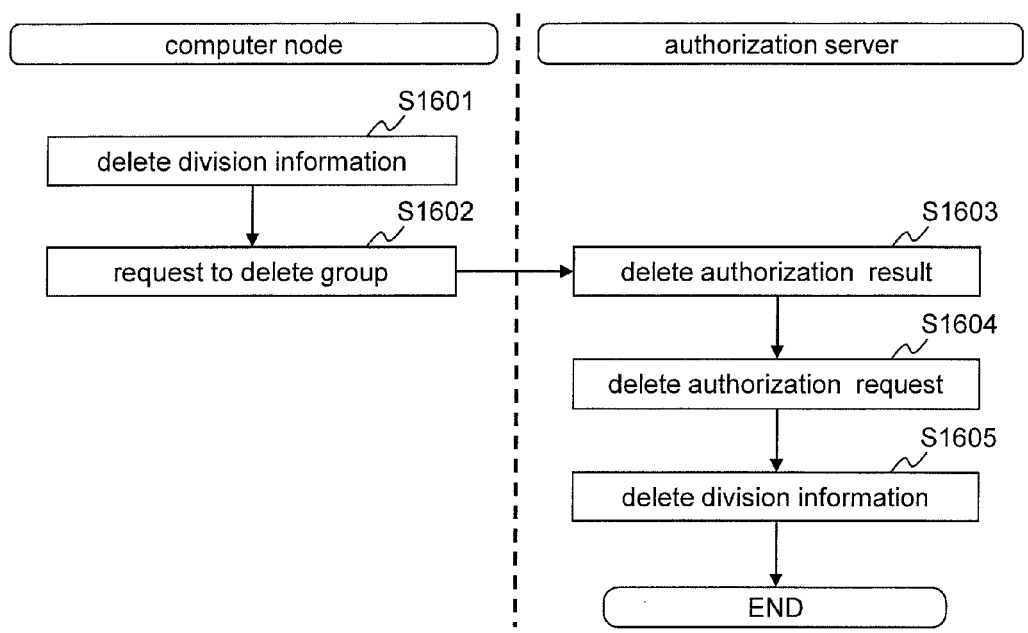
FIG. 16 is a diagram showing details of step S1216.

FIG. 16 is a diagram showing details of step S1216. Hereinafter, each step in FIG. 16 will be described.

(FIG. 16: Step S1601)

The group manager 140 in the computer node 100 searches the division information DB 420 using, as a search key, the group ID in which all jobs belonging the group are completed. The group manager 140 deletes the records acquired by the search. The authorization server 200 also performs a process similar to this step, thus this step may be omitted.

(FIG. 16: Step S1602-S1605)

The group manager 140 requests the authorization server 200 to delete the group corresponding to the records searched in step S1601 (S1602). The authorization unit 220 of the authorization server 200 uses the requested group ID as a search key, and deletes corresponding records from the authorization result DB 250, from the authorization request DB 240, and from the division information DB 420 (S1603-S1605). These records are not necessary after finishing all jobs belonging to the group, thus deleted. This prevents attacks such as illegally acquiring authorization results to illegally access computer resources.

Embodiment 2

Summary

As discussed thus far, the job execution system 1000 according to the embodiment 2 can employ any one of the group structures described in FIGS. 8-11. This enables performing appropriate authorization processes depending on job characteristics or authorizer's privileges described in FIGS. 8-11.

Embodiment 3

In the embodiments 1-2, a method for the priority determinator 230 to determine priorities of authorization requests is described, in which the authorization request has a higher priority as the number of authorizers concerned with vote is increased. In an embodiment 3 of the present invention, other methods for determining priority will be described. These methods may be used instead of those described in the embodiments 1-2, or may be used along with those described in the embodiments 1-2 by replacing the methods depending on such as job characteristics.

(Method for Determining Priority No. 1)

If a plurality of groups issue authorization requests for the same computer resource, it may be desirable to promptly determine the authorization result for that computer resource and to notify the requester of it. The priority of the authorization request for such computer resources may be higher as the number of related groups becomes larger. The number of authorization requests related to computer resources can be counted by grouping records (e.g. using "group by" phrase of SQL) using the resource ID field 243 in the authorization request DB 240 as a grouping key.

(Method for Determining Priority No. 2)

If a plurality of operational jobs belonging to the same group issue authorization requests, it is assumed that the operational jobs in the group are executed in a lot of nodes (occupying a lot of computer resources). As the number of operational jobs related to the authorization requests belonging to the same group becomes larger, the priority of the authorization requests from the group may be higher. The number of authorization requests for each of group can be counted by grouping the record using the group ID field 241 in the authorization requests DB 240 as a grouping key. When grouping authorization requests from the same requester, the authorization request has a higher priority as the number of the grouped records is larger.

(Method for Determining Priority No. 3)

If the number of computer resources related to the same group that are already authorized is large, it is assumed that the number of computer resources to which the jobs belonging to the group access may also be large. In such cases, it is assumed that the number of computer resources secured by the group may be large. The priority of authorization requests from the group may be larger as the number of computer resources related to the authorization request belonging to the same group is larger. The number of computer resources for each of group can be counted by grouping records using the group ID field 241 and the resource ID field 243 of the authorization request DB 240 as a grouping key.

Embodiment 4

In the embodiments 1-3, it is important in terms of security measure that the computer node 100 is not permitted to execute jobs using computer resources before the authorization server 200 sends authorization results to the computer node 100 indicating that access to the computer resources is permitted. Specific measures for achieving above may be such as below.

(Access Control Method Regarding Authorization No. 1)

If the computer resource used by the job is a data file, the data file is encrypted in advance for security. When sending an authorization result indicating that access to the computer resource is permitted, the authorization server 200 also sends a decryption key to the computer node 100. Accordingly, the data file cannot be read before acquiring an appropriate authorization result. Thus it is impossible to execute jobs even if the data file is accessed.

(Access Control Method Regarding Authorization No. 2)

A method similar to the method No. 1 may be assigning access privileges to the data file. For example, access to the data file is prohibited in advance by an access privilege on the file system. When sending an authorization result indicating that access to the computer resource is permitted, the authorization server 200 also sends information assigning access privilege to the computer node 100.

(Access Control Method Regarding Authorization No. 3)

The methods No. 1 and No. 2 are also beneficial in accessing to databases. Namely, data on databases may be encrypted or access privilege may be assigned to databases, thereby achieving similar effects.

(Access Control Method Regarding Authorization No. 4)

If the computer resource used by jobs is an arithmetic resource (e.g. CPU or memory) of the computer node 100, communications to the computer node 100 is previously shut down by such as fire walls. When sending an authorization result indicating that access to the computer resource is permitted, the authorization server 200 changes the configuration of the fire wall to permit the communication between the computer node 100 as the access source and the computer node 100 as the access destination.

The present invention is not limited to the embodiments, and various modified examples are included. The embodiments are described in detail to describe the present invention in an easily understood manner, and the embodiments are not necessarily limited to the embodiments that include all configurations described above. Part of the configuration of an embodiment can be replaced by the configuration of another embodiment. The configuration of an embodiment can be added to the configuration of another embodiment. Addition, deletion, and replacement of other configurations are also possible for part of the configurations of the embodiments.

For example, functional units in each computer may be exchanged, or may be aggregated on a computer. Specifically, the functional units of the authorization server 200 may be implemented on any one of the computer nodes 100. In addition, a computer node 100 may node need the job copier 151 and the resource divider 160 if the computer node 100 only executes divided jobs and does node create further divided jobs or derived jobs. In other words, each of the functional units described in the embodiments may be totally implemented by the job execution system 1000 without departing from the concept of distributed system.

The configurations, the functions, the processing units, the processing means, etc., may be realized by hardware such as by designing part or all of the components by an integrated circuit. A processor may interpret and execute programs for realizing the functions to realize the configurations, the functions, etc., by software. Information, such as programs, tables, and files, for realizing the functions can be stored in a recording device, such as a memory, a hard disk, and an SSD (Solid State Drive), or in a recording medium, such as an IC card, an SD card, and a DVD.

REFERENCE SIGNS LIST

100 computer node
110 job receiver
120 resource operation detector
130 authorization controller
140 group manager
150 job controller
160 resource divider
200 authorization server
210 request receiver
220 authorization unit
230 priority determinator
240 authorization request DB
250 authorization result DB
300 authorizer terminal
410 resource information DB
420 division information DB
1000 job execution system

The invention claimed is:

1. A job execution system comprising:
a job controller that executes an operational job using a computer resource;
an authorization controller that requests an authorization regarding whether the job controller permitted to execute the operational job using the computer resource and that receives an authorization result for the request;
a group manager that creates a group in which multiple of the operational jobs is grouped; and
a resource information storage that stores an ID of the computer resource which requires an authorization before used by the operational job,
wherein the authorization controller requests the authorization with respect to the operational job included in the group created by the group manager, and receives the authorization result with respect to the group,
wherein if the authorization controller receives the authorization result indicating that job execution is permitted with respect to the group, the job controller executes each of the operational jobs included in the group,
wherein if the authorization controller receives the authorization result indicating that job execution is not permitted with respect to the group, the job controller does not execute each of the operational jobs included in the group,
wherein if an ID of the computer resource used by the operational job is stored in the resource information storage, the authorization controller requests the authorization regarding whether execution is permitted for the operational job using the computer resource, and
wherein if no ID of the computer resource used by the operational job is stored in the resource information storage, the job controller executes the operational job using the computer resource even if the authorization controller does not request the authorization.

2. The job execution system according to claim 1, further comprising a job copier that creates a child job by copying the operational job, that distributes the child job to another computer node, and that makes the another computer node execute the child job,
wherein the group manager groups the child job created by the job copier,
and wherein the authorization controller requests the authorization with respect to the group including the child job.

3. The job execution system according to claim 2, further comprising a resource divider that divides the computer resource and that distributes the divided computer resource to the another computer node,
wherein the job copier instructs the another computer node to execute the child job using the computer resource distributed by the resource divider to the another computer node,
wherein the authorization controller requests the authorization with respect to an operational job before division which is an operational job that uses the computer resource before divided by the resource divider, the operational job before division being the operational job included in the group created by the group manager,
and wherein if the authorization controller receives the authorization result indicating that execution is permitted for the operational job before division, the job controller executes the operational jobs using the computer resources before and after divided by the resource divider, the operational jobs included in the group created by the group manager.

4. The job execution system according to claim 1,
wherein the computer resource is an encrypted data file,
wherein the authorization controller receives an decryption key for decrypting the computer resource along with the authorization result indicating that job execution is permitted with respect to the group,
and wherein the job controller executes the operational job using the computer resource decrypted by the decryption key.

5. The job execution system according to claim 2,
wherein when creating the child job, the job copier lets the child job inherit, from the operational job from which the child job is copied, an ID of the group to which the operational job belongs, or alternatively the job copier stores and ID of the computer resource used by the operational job or by the child job into a storage device along with an ID of the group,
and wherein the authorization controller identifies the group to which the operational job or the child job belongs by acquiring the 1D inherited by the child job from the operational job from which the child job is copied, or by reading from the storage device an ID of the group corresponding to the computer resource used by the operational job or by the child job.

6. The job execution system according to claim 5,
wherein the group manager groups the child jobs created by copying a same one of the operational job and an operational job derived from the child job into a same one of the group.

7. The job execution system according to claim 5,
wherein the group manager groups the child jobs created by copying a same one of the operational job into a same one of the group, and excludes from the group an operational job derived from the child job.

8. The job execution system according to claim 5,
wherein the group manager groups: the child jobs created by copying a same one of the operational job; an operational job derived from the child job; and the operational job from which the child job is copied, into a same one of the group.

9. The job execution system according to claim 5,
wherein the job copier handles, as the operational job, a job derived from an application job put from an upper application,
and wherein the group manager groups: the child jobs created by copying a same one of the operational job; an operational job derived from the child job; the operational job from which the child job is copied; and the application job from which the operational job from which the child job is copied is derived, into a same one of the group.

10. The job execution system according to claim 1, further comprising an authorization unit that determines whether or not to authorize a request of the authorization issued by the authorization controller and that notifies the authorization controller of an authorization result of the authorization.

11. The job execution system according to claim 10,
wherein if the authorization unit authorizes a request of the authorization issued by the authorization controller and if the computer resource is an encrypted data file, the authorization unit send a decryption key for decrypting the computer resource along with an authorization result with respect to the request of the authorization.

12. The job execution system according to claim 10, further comprising an authorization result storage that stores an ID of the group related to the request authorized by the authorization unit,
wherein the authorization unit stores and ID of the group stored in the authorization result storage until all of the operational jobs included in the group related to the authorized request are finished,
and wherein if the authorization unit receives the request with respect to a same one of the group which ID is stored in the authorization result storage, the authorization unit notifies the authorization controller of an authorization result indicating an authorized result without determining whether the request is authorized.

13. The job execution system according to claim 12,
wherein the group manager deletes the group after all of the operational jobs included in the group are finished,
and wherein after the group is deleted, the authorization unit deletes the authorization result stored in the authorization result storage associated with the deleted group.

14. The job execution system according to claim 10, further comprising a priority determinator that determines an authorization priority defining a sequence by which the authorization unit performs the authorization,
wherein the priority determinator increases the authorization priority as a number of the request with respect to the group becomes larger.

15. The job execution system according to claim 10, further comprising a priority determinator that determines an authorization priority defining a sequence by which the authorization unit performs the authorization,
wherein the authorization unit determines whether or not to authorize the request of the authorization according to authorization results with respect to the request received from a plurality of authorizers, and wherein the priority determinator increases the authorization priority as a number of the authorizers required for the authorization unit to determine whether or not to authorize the request of the authorization becomes larger.

16. The job execution system according to claim 10, further comprising a priority determinator that determines an authorization priority defining a sequence by which the authorization unit performs the authorization, wherein the priority determinator increases the authorization priority as a number of the operational jobs related to the authorization request included in the group becomes larger.

17. The job execution system according to claim 10, further comprising a priority determinator that determines an authorization priority defining a sequence by which the authorization unit performs the authorization, wherein the priority determinator increases the authorization priority as a number of the computer resources that are used by the operational job included in the group and that are already authorized becomes larger.

18. A job execution program that causes a computer to execute:

a job control step executing an operational job using a computer resource;

an authorization control step requesting an authorization regarding whether executing the operational job using the computer resource is permitted and receiving an authorization result for the request;

a group management step creating a group in which multiple of the operational jobs is grouped; and a resource information storage step storing an ID of the computer resource which requires an authorization before used by the operational job, wherein the authorization control step causing the computer to request the authorization with respect to the operational job included in the group created in the group management step, and to receive the authorization result with respect to the group, wherein if the authorization result indicating that job execution is permitted with respect to the group is received in the authorization control step, the job control step causing the computer to execute each of the operational jobs included in the group, and wherein if the authorization result indicating that job execution is not permitted with respect to the group is received in the authorization control step, the job control step causing the computer not to execute each of the operational jobs included in the group, wherein if an ID of the computer resource used by the operational job is stored in the resource information storage step, the authorization controller requests the authorization regarding whether execution is permitted for the operational job using the computer resource, and wherein if no ID of the computer resource used by the operational job is stored in the resource information storage step, the job controller executes the operational job using the computer resource even if the authorization controller does not request the authorization.

19. A computer-implemented job execution method comprising:

a job control step executing an operational job using a computer resource;

an authorization control step requesting an authorization regarding whether executing the operational job using the computer resource is permitted and receiving an authorization result for the request;

a group management step creating a group in which multiple of the operational jobs is grouped; and a resource information storage step storing an ID of the computer resource which requires an authorization before used by the operational job, wherein the authorization control step requesting the authorization with respect to the operational job included in the group created in the group management step, and receiving the authorization result with respect to the group, wherein if the authorization result indicating that job execution is permitted with respect to the group is received in the authorization control step, the job control step executing each of the operational jobs included in the group, and wherein if the authorization result indicating that job execution is not permitted with respect to the group is received in the authorization control step, the job control step not executing each of the operational jobs included in the group, wherein if an ID of the computer resource used by the operational job is stored in the resource information storage step, the authorization controller requests the authorization regarding whether execution is permitted for the operational job using the computer resource, and wherein if no ID of the computer resource used by the operational job is stored in the resource information storage step, the job controller executes the operational job using the computer resource even if the authorization controller does not request the authorization.

* * * * *